(12) United States Patent
Benefield

(10) Patent No.: US 11,463,854 B2
(45) Date of Patent: Oct. 4, 2022

(54) FREE SPACE OPTICAL TRANSMISSION SYSTEM FOR VEHICLE NETWORKING

(71) Applicant: Douglas Glass Benefield, Mt. Pleasant, SC (US)

(72) Inventor: Douglas Glass Benefield, Mt. Pleasant, SC (US)

(*) Notice: Subject to any disclaimer, the term of this patent is extended or adjusted under 35 U.S.C. 154(b) by 0 days.

(21) Appl. No.: 16/579,634

(22) Filed: Sep. 23, 2019

(65) Prior Publication Data
US 2020/0280829 A1  Sep. 3, 2020

Related U.S. Application Data

(60) Provisional application No. 62/735,663, filed on Sep. 24, 2018.

(51) Int. Cl.
| H04W 4/46 | (2018.01) |
| H04B 10/114 | (2013.01) |
| H04B 10/66 | (2013.01) |
| H04B 10/40 | (2013.01) |
| H04B 10/50 | (2013.01) |
| H04W 84/18 | (2009.01) |

(52) U.S. Cl.
CPC .......... *H04W 4/46* (2018.02); *H04B 10/1143* (2013.01); *H04B 10/40* (2013.01); *H04B 10/502* (2013.01); *H04B 10/66* (2013.01); *H04W 84/18* (2013.01)

(58) Field of Classification Search
CPC ....... H04W 4/46; H04W 84/18; H04W 4/024; H04W 4/06; H04B 10/1143; H04B 10/66; H04B 10/40; H04B 10/502; H04B 10/112; H04B 10/116

USPC ......................................................... 398/130
See application file for complete search history.

(56) References Cited

U.S. PATENT DOCUMENTS

| 4,432,622 A * | 2/1984 | Kawashima | G03B 3/10 396/119 |
| 6,512,617 B1 * | 1/2003 | Tanji | H04B 10/40 398/137 |
| 6,525,854 B1 * | 2/2003 | Takahashi | H04B 10/1143 398/115 |

(Continued)

*Primary Examiner* — Abbas H Alagheband
(74) *Attorney, Agent, or Firm* — Gregory Finch; Finch Paolino, LLC

(57) ABSTRACT

Vehicles are equipped with Free-Space-Optics (FSO) transceivers for establishing one or more inter-vehicle communication link. A vehicle, mounted with one or one or more FSO transceiver unit, may enable individual driver to initiate and engage automated communication, exchanging vehicle, road, or driving environment conditions, with another vehicle, forming a vehicle communication network. A group of vehicles may spontaneously, opportunistically, or automatically communicate with each other, forming a vehicle communication network. The FSO transceiver unit enables the determine independently or communicate concomitantly one or more inter-vehicle distance, range, location, speed, velocity, acceleration, using a position locating and range measurement system. Each vehicle can perform unicast, multicast, or broadcast communication using an On-Board Unit containing hardware and software to enable access to the in-vehicle bus systems to collect vehicle information for dissemination in real-time.

18 Claims, 5 Drawing Sheets

(56) References Cited

U.S. PATENT DOCUMENTS

| | | | | |
|---|---|---|---|---|
| 7,953,326 | B2* | 5/2011 | Farr | H04B 13/02 |
| | | | | 398/104 |
| 9,729,233 | B2* | 8/2017 | Nishino | H04B 10/112 |
| 2008/0122606 | A1* | 5/2008 | Bradley | B60Q 1/0017 |
| | | | | 340/468 |
| 2015/0088373 | A1* | 3/2015 | Wilkins | G05D 1/0293 |
| | | | | 701/36 |
| 2015/0258990 | A1* | 9/2015 | Stettner | B60W 30/08 |
| | | | | 701/1 |
| 2016/0047888 | A1* | 2/2016 | Roberts | G01S 17/931 |
| | | | | 701/300 |
| 2016/0121009 | A1* | 5/2016 | Farr | H04B 10/80 |
| | | | | 250/492.1 |
| 2016/0127042 | A1* | 5/2016 | Farr | H04B 10/11 |
| | | | | 398/104 |
| 2017/0195644 | A1* | 7/2017 | Shatz | H04B 17/23 |
| 2017/0230118 | A1* | 8/2017 | Shatz | H04N 5/272 |
| 2017/0346556 | A1* | 11/2017 | Tiecke | H04B 10/11 |
| 2018/0227055 | A1* | 8/2018 | Khatibzadeh | H04B 10/1143 |
| 2018/0288589 | A1* | 10/2018 | Punithan | H04W 28/02 |
| 2019/0179015 | A1* | 6/2019 | Raring | H01S 5/4012 |
| 2020/0213013 | A1* | 7/2020 | Lacovara | G08C 23/04 |

\* cited by examiner

FREE SPACE OPTICAL TRANSMISSION SYSTEM FOR VEHICLE NETWORKING

CROSS-REFERENCE TO RELATED APPLICATIONS

The present application claims the benefit of U.S. provisional application 62/735,663 filed Sep. 24, 2018, the disclosure of which is incorporated herein by reference in its entirety.

FIELD

The present disclosure relates to the field of automated vehicle systems; in particular, a system for automated vehicle networking utilizing free space optical transmissions.

BACKGROUND

Every year millions of people lose their lives in traffic accidents worldwide (WHO). Studies have shown that most roadway accidents could be avoided if a driver was warned just one-half seconds before the occurrence of a collision (NHTSA). Improved safety on the road is one of the major advantages made possible by wireless communications. Vehicle-to-vehicle communication (V2V) has been envisioned to provide enabling technologies to improve road safety as well as enhance transportation efficiency. The development of vehicular communication networks has created a variety of emergency services and applications. The sharing of safety-related information enables safety services, reduces traffic accidents significantly, and potentially provides an effective means of protecting commuters' health and life.

V2V communication consists of data exchange with passing vehicles, networking between vehicles travelling in the same direction, and emergency data broadcasting to other nearby vehicles. V2V communication requires vehicles to form a network. However, an underlying infrastructure is not usually available and therefore V2V communication employs an abrupt network composed of nodes that come together to form a self-organizing mesh network. A Vehicle Ad-hoc Network (VANET) is an ad-hoc mesh network, characterized by high-mobility, high channel load, that has vehicles equipped with one or more "on board" wireless communication devices as network nodes, operating in real-time. The nodes move relatively to one another but within the constraints of the road.

An ideal VANET should operate within an architecture that facilitates instant communication access for a vehicle to nearby vehicles to avoid accidents. The communication link should be efficient enough to provide the necessary range for accident avoidance, but also enough data capacity to deliver sophisticated service data. The architecture should allow reliable, low latency and high capacity communication between vehicles, supplemented with communication between vehicles and a roadside infrastructure.

Short-range RF-based wireless communication technology are the mostly suited communication medium for V2V communication. Most modern vehicles are fitted with Dedicated Short-Range Communication (DSRC), cellular, Wi-Fi, White-Fi etc., to enable vehicular networks to improve the driving experience and safety. The most prominent technology in VANET remains the vehicle-specific wireless fidelity (WIFI©) variation defined by the IEEE 802.11p standard. In the United States, the IEEE 802.11p is integrated in the IEEE 1609 wireless access in vehicular environments (WAVE) protocol stack to form the cornerstone of DSRC systems, especially designed for VANET and operating in the 5.9 GHz band. In Europe, IEEE 802.11p is also used, in a WAVE variant called ITS-G5, as a building block of the DSRC equivalent, called the Cooperative Intelligent Transportation System (C-ITS).

Vehicles within a VANET communicate directly within a signal range or using multi-hop paths between source and destination nodes. These paths are computed in a cooperative way using specific routing protocols, for example, unicast, multicast, or broadcast mode. A routing protocol specifies the way that two communication entities exchange information with each other. It includes establishing a route, information forwarding decision, and acting in maintaining the route or recovering from route failure. For wireless communications, the main purpose of routing protocols is to reduce communication time while using minimum network resources (devices and spectrum). A unicast protocol refers to a one-to-one transmission from one communication entity to another. The main goal of unicast is to transmit packets from a single source vehicle to another single destination vehicle via single/multi hops wireless communications, by either using a "hop-by-hop" mechanism or "store-and-forward" one. A multicast routing protocol uses a one-to-many communication to transfer a message from a single source while a broadcast routing protocol uses a one-to-all communication method to transfer a message to all receivers simultaneously. For vehicular networks, broadcast is an important routing method, which is usually used to discover nearby neighbors, propagate useful traffic information to other vehicles to support safety-related and cooperative driving, and disseminate a unicast protocol.

VANETs have distinctive characteristics and communication requirements given that vehicles move at very high speeds along restricted and predictable road paths. These challenging communication requirements include short contact time, low connectivity disruption, low packet losses, frequent topology changes, and high channel load in dense traffic environments. Rapid transmission speed, low latency, stability, and a dedicated spectrum make DSRC the optimal communication media for VANETs. However, DSRC and C-ITS are very sensitive to channel congestion during dense traffic when there are many vehicles, amplified by a limited bandwidth of 75 Megahertz (MHz) around 5.9 Gigahertz (GHz). Consequently, as the future adoption of DSRC increases, the channel congestion and the resulting communication delay will become worse and concerning. The RF spectrum covers only 300 GHz, mainly regulated by the International Telecommunication Union (ITU), and already considered overcrowded. It is anticipated that the future shortage will worsen given the dramatic growth of mobile and connected devices and consumer applications (e.g., video streaming). Excessive delays may impose more stringent requirements to meet safety standards. For example, during an emergency event, all the vehicles with a VANETS might broadcast safety warning messages simultaneously which could result in a broadcast storm, one that can cause dramatic channel congestion resulting in severe channel performance degradations, disrupting real-time safety-critical applications and information dissemination, potentially leading to a fatal accident. The need exists to address channel congestion and communication delay of conventional RF communication technologies for vehicle communication networks, particularly VANETs.

Free Space Optics ("FSO") is a line-of-sight technology which utilizes lasers or Light Emitting Diodes (LEDs) and photo detectors to provide wireless optical connections between two points. FSO units consist of an optical transceiver with a light energy transmitter and a photo detector receiver to provide full duplex bi-directional capability. FSO systems use visible or invisible infrared light energy wavelengths. Visible light communication (VLC) is an emergent FSO technology, which uses white or color LEDs to provide information through visible light as the communication medium. FSO communication has short and long-range capabilities and is immune to electromagnetic interference cause by nearby electronic devices. FSO communication is not subject to frequency spectrum regulations providing the benefit of expanding the available communication channels for vehicle communication networks beyond RF frequencies. FSO systems can provide transmissions rates to theoretically reach speeds of 2.5 Gbps. The aforementioned attributes make FSO a technology capable of addressing the short-comings of using conventional RF communication within vehicle communication networks including VANETs.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

An object of the present invention is a vehicle-to-vehicle communication system comprising at least one free space optical transmitter being operably configured to receive a binary data stream input, the at least one free space optical transmitter comprising a modulator, a diode driver, and at least one diode, the modulator being operable engaged with the diode driver to convert the binary data stream according to a predetermined modulation schema into a series of modulated electrical inputs, the at least one diode being operably engaged with the diode driver convert the series of modulated electrical inputs into a modulated optical output; at least one free space optical receiver operably engaged with the at least one free space optical transmitter, the at least one free space optical receiver comprising a photodetector, an amplifier-filter and an analog-to-digital converter, the photodetector being operable to receive and convert the modulated optical output into an electrical signal, the electrical signal being processed through the amplifier-filter and converted to a digital data stream via the analog-to-digital converter, the demodulator being operable to decode the digital data stream to produce an encoded digital data stream output; and, at least one self-contained light assembly being mountable to a front, side, rear, top, or bottom location of a vehicle, the at least one free space optical transmitter and the at least one optical receiver being housed within the at least one self-contained light assembly.

Another object of the present invention is a free space optical communication system comprising at least one free space optical transmitter being operably configured to receive a binary data stream input, the at least one free space optical transmitter comprising a modulator, a diode driver, and at least one diode, the modulator being operable engaged with the diode driver to convert the binary data stream according to a modulation schema into a series of modulated electrical inputs, the at least one diode being operably engaged with the diode driver convert the series of modulated electrical inputs into an output electrical photocurrent; at least one free space optical receiver operably engaged with the at least one free space optical transmitter, the at least one free space optical receiver comprising a photodetector, an amplifier-filter and an analog-to-digital converter, the photodetector being operable to receive and convert the modulated optical output into an electrical signal, the electrical signal being processed through the amplifier-filter and converted to a digital data stream via the analog-to-digital converter, the demodulator being operable to decode the digital data stream to produce an encoded digital data stream output; at least one self-contained light assembly being mountable to a front, side, rear, top, or bottom location of a vehicle, the at least one free space optical transmitter and the at least one optical receiver being operably engaged with the at least one self-contained light assembly; and, at least one mountable on board unit comprising a processor, at least one memory device, and input/output device, and a user interface, the at least one mountable on board unit being operable to control the at least one free space optical transmitter and the at least one optical receiver.

Yet another object of the present invention is a vehicle-to-vehicle communication network comprising a plurality of vehicles, each vehicle in the plurality of vehicles having at least one free space optical transceiver, at least one self-contained light assembly, and an on board unit, the at least one free space optical transceiver being operable to send and receive free space optical transmissions, the at least one self-contained light assembly being mounted to a front, side, rear, top, or bottom location of each vehicle in the plurality of vehicles and being operably engaged with the at least one free space optical transceiver, the on board unit being operably engaged with the at least one free space optical transceiver and the at least one self-contained light assembly to execute at least one vehicle-to-vehicle network communication protocol.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

Applicant has perceived a need for a device and system that not only overcomes the drawbacks associated with aforementioned challenges of vehicle-to-vehicle communication networks using conventional RF communication technologies. Overcoming these drawbacks, and other benefits, are attendant to an FSO system and methods disclosed herein.

In an aspect of the present disclosure, a vehicle network comprises one or more vehicles, each vehicle equipped with at least one Free Space Optics (herein "FSO") transceiver unit, the unit enables the establishment of one or more optical wireless vehicle-to-vehicle (herein "V2V") communication channel. The FSO transceiver unit comprises an optical transmitter and a receiver configured within a self-contained light assembly mountable to a front, side, rear, top, or bottom location of a vehicle. In an embodiment, a group of vehicles, each mounted with one or more FSO transceiver unit, under process control, spontaneously, opportunistically, or automatically communicates with each other, forming a vehicle communication network, preferably a Vehicle Ad-hoc Network (herein "VANET").

In another aspect of the present disclosure, a vehicle network comprises one or more vehicle, each vehicle equipped with at least one FSO transceiver unit, the unit enables the establishment of one or more optical wireless V2V communication channel. The FSO transceiver unit comprises an optical transmitter and a receiver configured within a self-contained light assembly mountable to a front, side, rear, top, or bottom location of a vehicle. In an embodiment, a group of vehicles, each mounted with one or more FSO transceiver unit, enables a driver to engage automated communication with another vehicle, forming a vehicle communication network, preferably a VANET.

In another aspect of the present disclosure, a vehicle network comprises one or more vehicles, each vehicle equipped with at least one FSO transceiver unit, the unit enables the establishment of one or more optical wireless V2V communication channel. The FSO transceiver unit comprises an optical transmitter and a receiver configured within a self-contained light assembly mountable to a front, side, rear, top, or bottom location of a vehicle. In an embodiment, one or more vehicles, each mounted with one or more FSO transceiver unit, under process control, spontaneously, opportunistically, or automatically determines at least one inter-vehicle distance, range, location, speed, velocity, acceleration, or the like, using one or more position locating and range measurement systems.

In another aspect of the present disclosure, a vehicle network comprises one or more vehicles, each vehicle equipped with at least one FSO transceiver unit, the unit enables the establishment of one or more optical wireless V2V communication channel. The FSO transceiver unit comprises an optical transmitter and a receiver configured within a self-contained light assembly mountable to the front, side, or rear location of a vehicle. In an embodiment, one or more vehicles, each mounted with one or more FSO transceiver unit, spontaneously, opportunistically, or automatically communicates to determine an inter-vehicle distance, range, location, speed, velocity, acceleration, or the like, using one or more position locating and range measurement systems. In another embodiment, a vehicle uses one or more intra-vehicle FSO transceiver unit to automatically communicate at least one inter-vehicle distance, range, location, speed, velocity, acceleration, or the like. In yet another embodiment, the said vehicle network uses one or more inter-vehicle FSO transceiver units to automatically communicate at least one inter-vehicle distance, range, location, speed, velocity, acceleration, or the like.

In another aspect of the present disclosure, a vehicle network comprises one or more vehicle, each vehicle equipped with at least one FSO transceiver unit, the unit enables the establishment of one or more optical wireless V2V communication channels. The FSO transceiver unit comprises an optical transmitter and a receiver configured within a self-contained light assembly mountable to the front, side, or rear location of a vehicle. In an embodiment, a vehicle uses one or more intra-vehicle FSO transceiver unit to measure and simultaneously communicate at least one inter-vehicle distance, range, location, speed, velocity, acceleration, or the like. In another embodiment, one or more inter-vehicle FSO transceiver unit is used to measure and simultaneously communicate at least one inter-vehicle distance, range, location, speed, velocity, acceleration, or the like.

In another aspect of the present disclosure, a vehicle network comprises one or more vehicles, each vehicle equipped with at least one FSO transceiver unit, the units enable the establishment of one or more optical wireless V2V communication channel. The FSO transceiver unit comprises an optical transmitter and a receiver configured within a self-contained light assembly mountable to the front, side, or rear location of a vehicle. In an embodiment, a group of vehicles, each mounted with one or more FSO transceiver unit, communicates with one another, forming a communication network for exchanging information of, including but not limited to, location, range, distance, speed, heading, velocity, acceleration, braking, deceleration, emergency breaking, forward collision warning, blind spot warning, lane change warning, traffic jam warning, curve speed warning, hazard location notification, maintaining a dynamic state map, perform continuous threat assessment, emergency vehicle, identify dangerous scenarios, inoperative vehicles, crash event, cooperative adaptive cruise control, cooperative merging, automatic longitudinal or lateral gap distance keeping, cooperative awareness messaging, decentralized environment notifications, alerts, or the like.

In another aspect of the present disclosure, a vehicle of the network is equipped with a mountable On-Board Unit (herein "OBU"). The OBU comprises one or more light assembly containing at least one FSO transceiver and non-limiting hardware including a processor, microprocessor, microcontroller, read-write memory device, read-only memory device (ROM), random access memory (RAM), flash memory, memory storage device, memory I-O, I-O device, buttons, or user interface. The device performs from a tangible, non-transitory computer-readable medium (memory), one or executable codes, algorithms, methods, and or software instructions for data transmission. In a preferred embodiment, the OBU incorporates software to run a VANET stack, including but not limited to a physical, data, and layer protocol, using the microprocessor. In yet another embodiment, the OBU communicates with one or more in-vehicle bus systems, including but not limited to, at least one Vehicle Control Unit (herein "VCU"), Electronic Control Unit (herein "ECU"), Control Area Network (CAN), or gateway, to collect vehicle information from a sensor, an actuator, engine, motor, traction control system, transmission, gearbox, door, roof, seat, A/C, airbag, computer, multimedia system, navigation system (e.g., GPS), or the like. In a preferred embodiment, the OBU enables a vehicle to send, receive, or route information within a vehicle communication network.

In another aspect of the present invention, the FSO transceiver unit comprises one or more optical transmitter and detector. In an embodiment, the transmitter incorporates one or more non-limiting optical coherent, non-coherent light sources including laser, laser diode, light emitting diode (LED), LED vehicle head lamp, LED vehicle brake lamp, commercially available off-the-shelf (COTS) headlights, COTS taillights, or the like. In an embodiment, the detector incorporates one or more non-limiting photodetectors including photodiodes, PIN photodiode, avalanche photodiodes (ADP), CCD camera, CCD array detectors, or the like. In a preferred embodiment, data from a vehicle is collected, encoded, and modulated, and transmitted using a light source driver. In another preferred embodiment, light signal from another vehicle is focused, by an optical front-end, on said photodetector, connected to a sequence of non-limiting components including an amplifier, a transimpedance amplifier, a filter, or an analog-to-digital (A/D) converter. The resulting signal from said connections is processed to enhance its Signal-to-Noise ratio (SNR) and data is retrieved after demodulation and decoding. The FSO transceiver unit preferably incorporates the use of one or more non-limiting modulation, data format, and decoding scheme for V2V communication. In another preferred embodiment, the FSO transceiver unit incorporates a distance and range measurement module for the independent or cooperative vehicle network determination of inter-vehicle distance, range, location, speed, velocity, acceleration, or the like.

In another aspect of the present disclosure, a vehicle network comprises one or more vehicles, each vehicle equipped with at least one FSO transceiver unit, the units enable the establishment of one or more optical wireless V2V communication channel. The FSO transceiver unit comprises an optical transmitter and a receiver configured within a self-contained light assembly mountable to the front, side, or rear location of a vehicle. In an embodiment, a group of vehicles, each mounted with one or more FSO transceiver unit, communicates with one another, forming one or more communication network topology for vehicle information exchange, using one or more broadcast protocols. The protocols including but not limited to, a peer-to-peer, star, a unicast (e.g., between passing vehicles), multicast (e.g., platooning) a broadcast (e.g., accident warning), a combination thereof, or the like. In a preferred embodiment, the FSO transceiver unit together with said protocols enable fully distributed V2V communication with minimal connectivity disruption and packet losses, capable of adaptive handling of frequent topology changes, and accommodate high channel load in dense traffic environments, to meet safety and efficiency standards.

BRIEF DESCRIPTION OF DRAWINGS

The above and other objects, features and advantages of the present disclosure will be more apparent from the following detailed description taken in conjunction with the accompanying drawings, in which.

DETAILED DESCRIPTION

Figure 1:
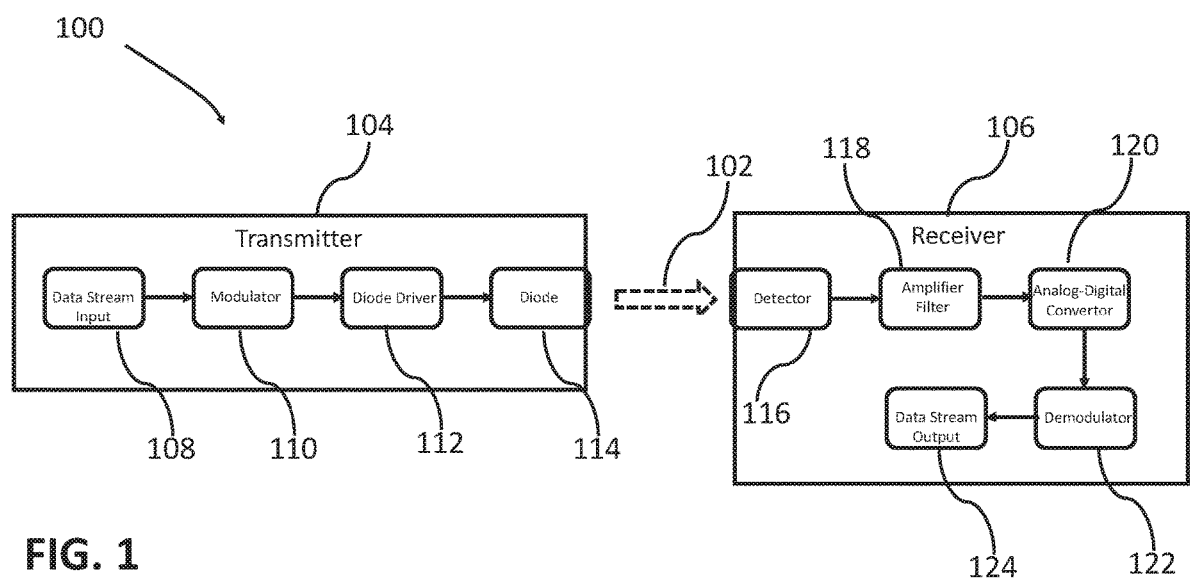
FIG. 1 is an exemplary illustration of an FSO wireless telecommunication channel.

Exemplary embodiments are described herein to provide a detailed description of the present disclosure. Variations of these embodiments will be apparent to those of skill in the art. Moreover, certain terminology is used in the following description for convenience only and is not limiting. For example, the words "right," "left," "top," "bottom," "upper," "lower," "inner" and "outer" designate directions in the drawings to which reference is made. The word "a" is defined to mean "at least one." The terminology includes the words above specifically mentioned, derivatives thereof, and words of similar import.

Unless otherwise defined, all terms (including technical and scientific terms) used herein have the same meaning as commonly understood by one of ordinary skill in the art to which these embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

It will be further understood that the terms "comprises," "comprising," "includes," and/or "including,", and variants thereof, when used herein, specify the presence of stated features, steps, operations, elements, and/or components, but do not preclude the presence or addition of one or more other features, steps, operations, elements, components, and/or groups thereof.

Numerous alternative embodiments of a vehicle-to-vehicle communication (herein after "V2V") network system and components are described herein. In general, the individual vehicles are equipped with Free-Space-Optics (herein after "FSO") transceivers for establishing one or more inter-vehicle communication link. An FSO transceiver unit comprises an optical transmitter and a receiver configured within a self-contained light assembly mountable to a front, side, rear, top, or bottom location of a vehicle. A vehicle, mounted with one or one or more FSO transceiver unit, may enable individual driver to initiate and engage automated communication, exchanging vehicle, road, or driving environment conditions, with another vehicle, forming a vehicle communication network. A group of vehicles, mounted with one or one or more FSO transceiver unit, may spontaneously, opportunistically, or automatically communicates with each other, forming a vehicle communication network, preferably a Vehicle Ad-hoc Network (herein "VANET"). The FSO transceiver unit enables the determine independently or communicate concomitantly one or more inter-vehicle distance, range, location, speed, velocity, acceleration, or the like, using one or more position locating and range measurement systems. Each vehicle can perform unicast, multicast, or broadcast communication using at least one communication protocol through a mountable On-Board Unit (herein after "OBU"). The OBU comprises hardware and software to enable access to the in-vehicle bus systems, including but not limited to, at least one Vehicle Control Unit (herein after "VCU"), Electronic Control Unit (herein after "ECU"), Control Area Network (herein after "CAN"), or gateway, to collect vehicle information for dissemination. The OBU software enables a driver or automated vehicle to access the physical, data, or a high-level application through a structured VANET stack.

FIG. 1 illustrate an exemplary FSO wireless telecommunication channel 100 according to an aspect of the present disclosure. FSO is a line-of-sight (herein after "LOS") technology or system that uses optical energy wavelengths (e.g., visible, near-infrared (IR), IR, etc.) to provide a wireless optical connection 102 between a transmitter 104 and a receiver 106 for data transmission. The link is said LOS when the light signal can be directly collected by the receiver or, in other words, when a part of the emitter beam pattern falls into the Field-of-View (herein after "FOV") of the receiver. In general, transmitter 104 enables a digital (binary) data stream 108 to be converted using an encoding technique and then modulated onto the light waves as a sequence of light pulses using a modulator 110 and a diode driver 112 that provides an electrical input signal to a light emitting diode 114 that facilitates the electro-optical conversion process. The two most popular diodes are a light emitting diode (herein after "LED") and a laser diode (herein after "LD"). These emitters usually operate in the 850-950 nm wavelength band. Receiver 106 contains a photodetector 116 capable of capturing light emitted by diode 114. Photodetector 116 facilitated the opto-electrical conversion process, turning the captured light energy into an electrical signal. An output electrical photocurrent is proportional to the irradiance at the receiver. The analog photocurrent electrical signal is processed through an amplifier-filter 118 and converted to a digital format with an analog-to-digital converter 120. The transmitted data stream is decoded using demodulator 122 to produce the encoded data stream output 124. FSO communication has long-range capabilities and is immune to electromagnetic interference cause by nearby electronic devices. FSO communication is not subject to frequency spectrum regulations and utilizes a high carrier frequency in the optical range. The use of the optical range frequency allows FSO transmissions rates to reach theoretical speeds of 2.5 Gbps. The spectrum of visible light communication (herein after "VLC") is between 385 and 800 THz.

Figure 2:
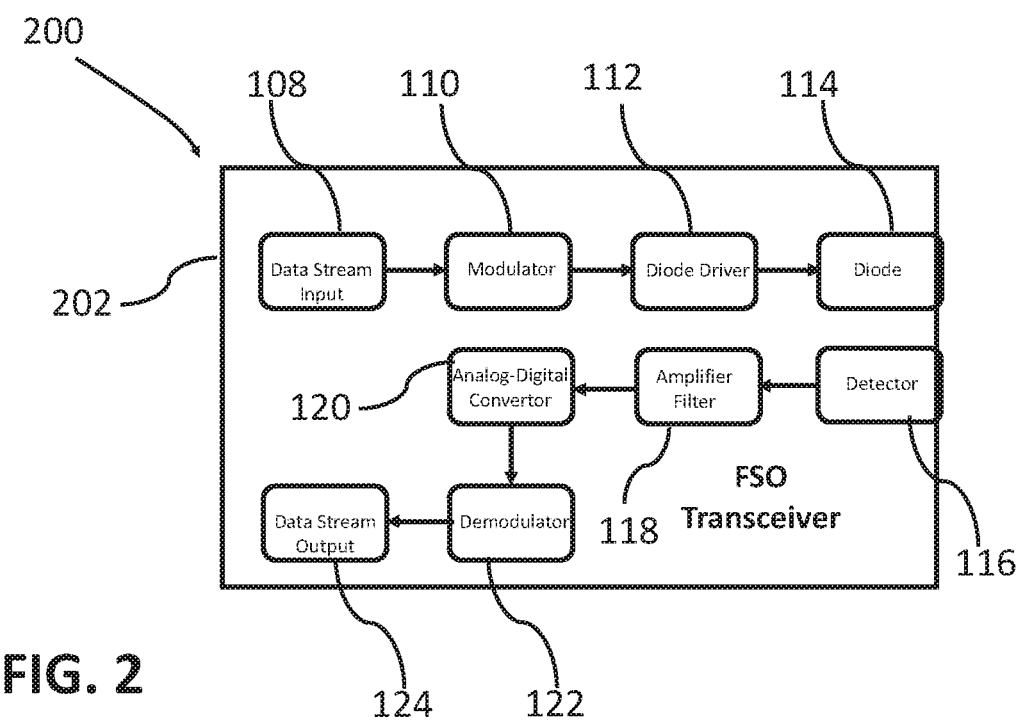
FIG. 2 is an exemplary illustration of an FSO transmitter-receiver unit.

FIG. 2 illustrates an exemplary FSO transmitter-receiver unit (herein after "transceiver") 200 according to an aspect of the present disclosure. An FSO transceiver unit 202 comprises said transmitter 104 and said receiver 106 of FIG. 1. It is understood that FSO transceiver unit may incorporate one or more said hardware and software components as to enable it to function as transceiver to provide full duplex bi-directional communication capabilities. Diode 114 of FIG. 1 may be in a non-limiting LD, LED, VLC LED, color (e.g., RGB) LED, white LED, blue LED, ultraviolet LED, phosphor-based LED, organic LED, quantum-dot, high-powered LED, taillight LED, headlamp LED, visible light LED, micro LED, double heterostructure laser, quantum well laser, quantum cascade laser, resonant-cavity, distributed Bragg reflector laser, distributed feedback, vertical-cavity surface-emitting, vertical-external-cavity surface emitting, and non-limitingly fabricated from GaAs, AlGaAs, GaAsP, AlGaInP, GaP, AlGaP, InGaN, SiC, Si, and combinations thereof. Diode driver 112 may be in a non-limiting drive circuit capable of supplying stable and predictable current to a diode, for example a MOSFET circuit driver. Methods to attain a desired stable optical output may include but not limited to automatic current control, constant current control, auto power control, or the like. Photodetector 116 of FIG. 1 may be a non-limiting PIN photodiode, avalanche photodiode, CMOS sensor, CCD, CCD array, and or combinations thereof, constructed from one or more combination of opto-electro conversion materials. One or more photodiode may be configured as an array for enhanced signal detection. In a preferred embodiment, the performance of photodetector 116 may be augmented using one or elements (e.g., optical system) to enhance the received optical power or to boost the signal-to-noise ratio (herein after "SNR"). The optical system may include non-limiting lenses (e.g., aspheric, convex) configured to establish an optimal FOV and to collect, focus, and propagate onto the active surface of a photodetector or an array of photodetectors. Amplifier-filter 118 may incorporate a non-limiting transimpedance amplifier (TIA) to boost the SNR. FSO transceiver unit 202 may be a stand-alone unit or may be incorporated into a light assembly. The light assembly may be in a non-limiting form of vehicle headlight, taillight, side mirror light, a roof-top light assembly, rear light assembly, or the like.

Still referring to FIG. 2, a digital bit data stream is conveyed from the source within the visible or infrared energy that can be transmitted physically to another FSO transceiver. A modulation defines symbols of the data stream that is translated into specific signal wave forms. A modulation has its own achievable data and a specific evolution of a Bit-Error-Rate (BER) constrained by the SNR. Modulation techniques are mainly divided into single carrier modulation (SCM) and multicarrier (MCM) modulation. The modulation process occurs within the modulator 110 within the transmitter chain and a duplex signal can be received and processed the demodulator 118 within receiver chain. Both the modulator at the transmitter and the demodulator at the receiver are structured so that they perform inverse operations. In an embodiment, V2V communication incorporates, but not limited to, On-Off Key (OOK) modulation, pulse-position modulation (PPM), two schemes recommended by IEEE 802.15.7 VLC for outdoor applications. Using OOK, a data bit 1 is sent by radiating power from diode 114 of FIG. 1 and a data bit 0 is sent when the light transmitter is in an off state. The rate of bit transmission is equal to the clock rate of the transmitter and equivalent to the data rate. In a yet another embodiment, OOK is combined with, but not limited to, Manchester coding, to limit the number of consecutive 0 or 1 to two, to avoid visible flicker, allowing reshaping of the original spectrum of the OOK signal, mitigating low-frequency interfering components from ambient light sources, limiting distortions, or the like. In an alternative embodiment, Pulse width modulation (PWM), the common form PPM-4, where the incoming data stream bits are taken by groups of two to determine slot location. This technique allows thus to double the data rate compared to OOK. In an alternative embodiment, the present invention may incorporate other non-limiting modulation schemes within the function of the FSO transceiver. These modulation schemes are: SCM, OOK, PWM, M-PAM, M-PPM, DFT+OFDM, CAP, OFDM(MCM), DCO-OFDM, Inherent unipolar, ACO-OFDM, PAM-DMT, U-OFDM, superposition OFDM, eU-OFDM, eACO-OFDM, ePAM-DMT, SEE-OFDM, LACO-OFDM, RPO-OFDM, P-OFDM, spatial-OFDM, ASCO-OFDM, SFO-OFDM, PM-OFDM, ADO-OFDM, HACO-OFDM, HCM, WPDM, DHT, color-domain modulation, CSK, CIM, MM, combinations thereof, or the like. The data, after modulation, are formatted into packets of specific form, preferably containing non-limiting information including, a header, synchronization information, communication protocol information, modulation scheme, packet length, or the like. Once received and reconstructed, the packets must be decoded using a corresponding demodulator 122 for original data retrieval. In an embodiment, for OOK modulation, clock decoding can be used whereby the current bit value is the value of the data signal at an occurrence of a rising edge of a decoding clock of frequency fc. In an alternative embodiment, for PPM modulation, pulse width decoding, does not require such a stable clock, and measures the width of each continuous level by counting the number of high-speed clock ticks. It is understood that one or more designs and components of the said FSO transceiver may be combined and implemented using a field programmable gate array (FPGA) or an application specific integrated circuit (ASIC).

Figure 3:
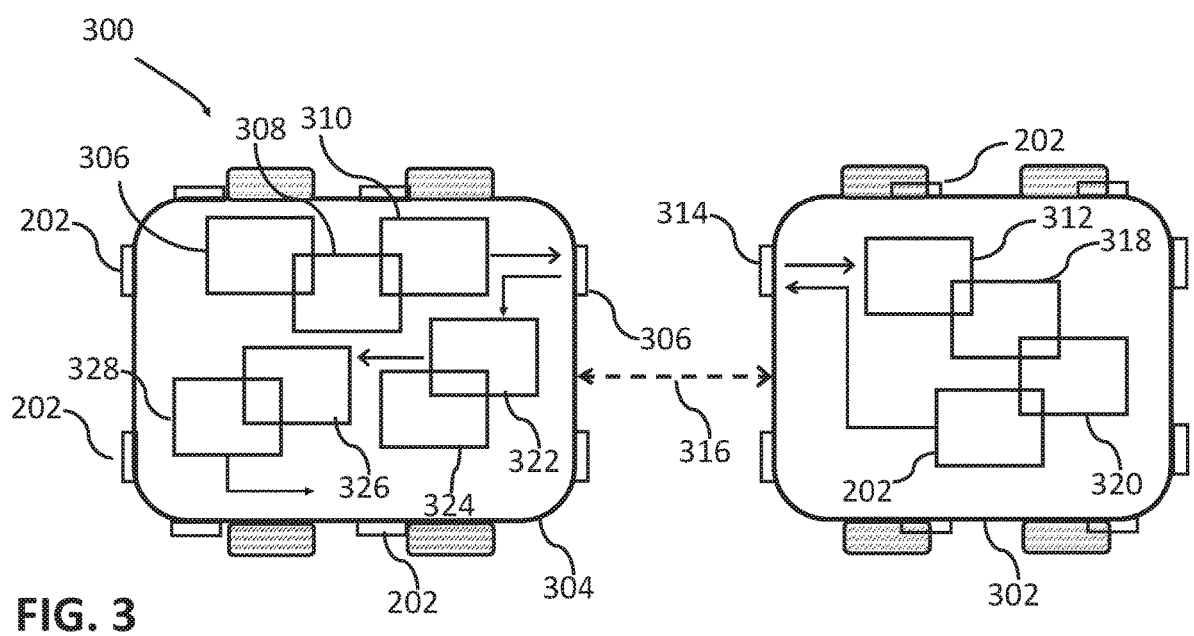
FIG. 3 is an exemplary illustration of a configuration for inter-vehicle position location and range measurement.

FIG. 3 illustrate an exemplary configuration 300 for inter-vehicle position location and range measurement according to an aspect of the present disclosure. Vehicle 302 and 304 are equipped with one or more said FSO transceiver 202 of FIG. 2. FSO transceiver 202 are placed at one or more locations on a vehicle, for example, at locations corresponding the rear right and left taillights of vehicle 302, and forward headlamp left and right locations of vehicle 304.

The FSO transceivers are configured as to enable the determination of position and range of to initiate, establish, and maintain a V2V communication link for vehicle information exchange. Several non-limiting location and ranging methods may be implemented within the present invention to determine inter-vehicle position and distance. These methods include, time of flight, phase-shift measurement, frequency modulation, triangulation, interferometry, swept focus, and return signal intensity. In a preferred embodiment, the inter-vehicle position and range are determined using phase-shift measurement. An FSO unit 306 of following vehicle 304 first encodes a digital data stream 306 incorporating a clock signal from clock generator 308 as an encoded message 310 and sent to vehicle 302 using the emitter of FSO transceiver unit 306. The encoded message 310 is received after free-space propagation by FSO a receiver 312 transceiver unit 314 located at the rear of leading vehicle 302. The signal arriving at receiver 312 is distorted and delayed compared to the original message signal 310 by a time proportional to the V2V distance 316. The arriving signal 310 can be reconstructed using signal processor 318 to extract a message component and a clock information from the signal 310. The clock information can be recovered using Phase-Lock-Loop (PLL) 320. The clock signal recovered can be used by leading vehicle 302 to transmit a data stream back to vehicle 304 received by receiver 322 through FSO transceiver unit 306. A message component sent from vehicle 302 is retrieved by decoder 324 and second clock signal is recovered by PLL 326. The clock signal transmitted by vehicle 304 and the retransmitted clock signal from vehicle 302 have a phase shift that is proportional to V2V distant 316. The phase shift is measured using phase shift measurer 328. The said ranging method may be implemented in any of the FSO transceiver units located in any said placement locations on, about, within, or within the proximity of a vehicle. The ranging method may allow one or more front, rear, bottom, or side FSO transceiver unit to determine one or more inter-vehicle position, range, or distance within the unit's FOV to provide a comprehensive location and range of one or more vehicle located in front, behind, side, or within a detectable proximity of a vehicle.

Figure 4:
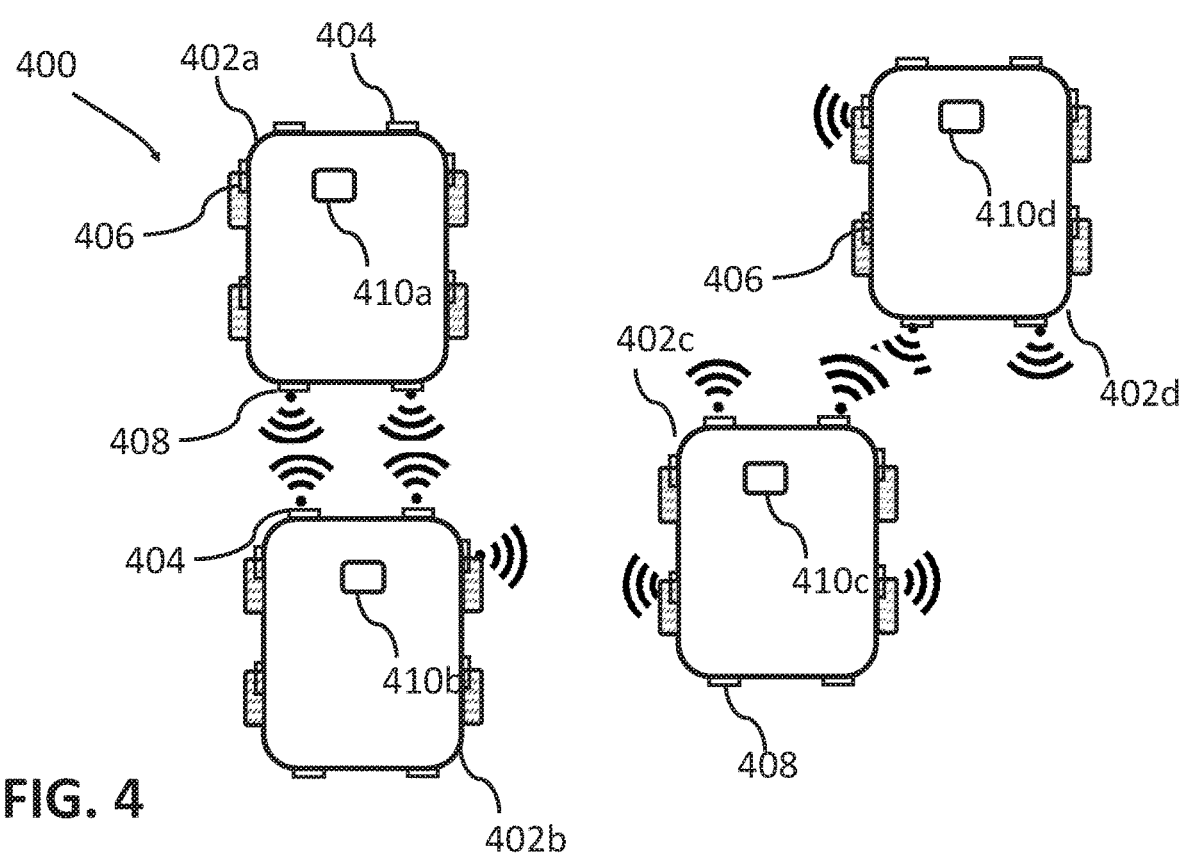
FIG. 4 is a diagrammatic representation of a V2V communication network.

Referring now to FIG. 4, which is a diagrammatic representation of a V2V communication network 400 of vehicles equipped with FSO transceiver units. According to an embodiment, a set of vehicles 402a-d are networked together using one or more FSO transceiver units 202 of FIG. 2. The vehicles are outfitted with one or more front light assembly 404, corresponding to an FSO transceiver unit 202 of FIG. 2, one or more side light assembly 406 and one or more rear light assembly 408. Vehicle 420a-d may spontaneously, opportunistically, or automatically communicate with each other, forming a vehicle communication network, preferably a VANET. One or more FSO transceiver unit enables the vehicle to determine independently or communicate concomitantly one or more inter-vehicle distance, range, location, speed, velocity, acceleration, or the like, using one or more position locating and range measurement system detailed in FIG. 3. Each vehicle can perform unicast, multicast, or broadcast communication using at least one communication protocol through an OBU 410a-d. The OBU comprises hardware (e.g., processor, etc.) and software to enable access to the in-vehicle bus systems, including but not limited to, at least one VCU, ECU, CAN, or gateway, to collect vehicle information for dissemination. The OBU software enables a driver or automated vehicle to access the physical, data, or a high-level application through a structured VANET stack for medium access control (MAC) and communication coordination. All signal data is communicated to and from a central processor of an OBU. In an embodiment, OBU 410a of vehicle 402a conveys information regarding real-time behavior of vehicle 402a such as speed, in a digital bit stream transmitted by an FSO transceiver unit within rear light assembly 408 to vehicle 402b. An FSO transceiver unit within the front light assembly 404 of vehicle 402b receives the visible light signal and decodes the digital data and sends it to OBU 410b for processing. In an embodiment, OBU 410c of vehicle 402a conveys information regarding real-time behavior of vehicle 402c, for example, lane drift, in a digital bit stream using an FSO transceiver unit of a side light assembly 406 of vehicle 402c. In yet another embodiment, OBU 410a of vehicle 402a conveys information regarding real-time behavior of vehicle 402a such as braking. The information details the number of vehicles ahead in which the braking is occurring. This diagram illustrates the advantage of FSO in utilizing its ability to communicate with minimal interference among multiple vehicles over a long-range. The vehicles are able to form a communication network for exchanging information of, including but not limited to, location, range, distance, speed, heading, velocity, acceleration, braking, deceleration, emergency breaking, forward collision warning, blind spot warning, lane change warning, traffic jam warning, curve speed warning, hazard location notification, maintaining a dynamic state map, perform continuous threat assessment, emergency vehicle, identify dangerous scenarios, inoperative vehicles, crash event, cooperative adaptive cruise control, cooperative merging, automatic longitudinal or lateral gap distance keeping, cooperative awareness messaging, decentralized environment notifications, alerts, or the like.

Figure 5:
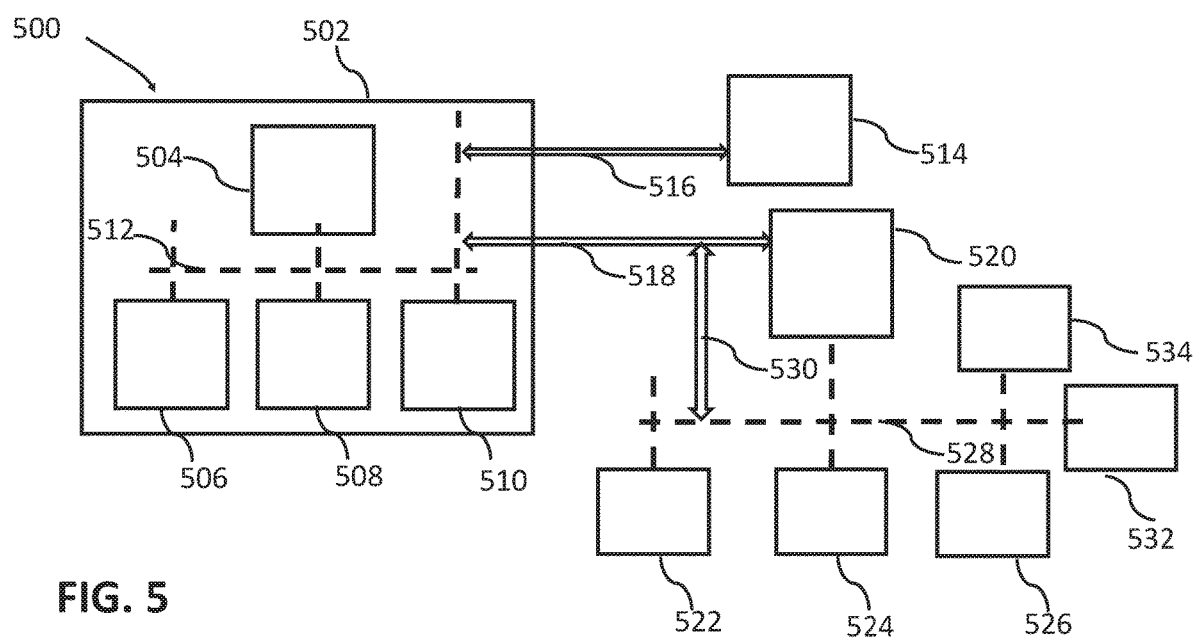
FIG. 5 is a diagrammatic representation of the OBU of a vehicle for accessing vehicle information and conducting V2V communication.

Referring now to FIG. 5, a diagrammatic representation 500 of the OBU of a vehicle for accessing vehicle information and conducting communication using one or more FSO transceiver units. An OBU 502 comprises non-limiting number of hardware components including a processor 504, one or more memory device 506, I/O device 508, a user interface 510. The hardware components communicate through one or more bus line 512. Bus line 512 may support additional device to enable OBU to control one or more FSO transceiver unit 514 through communication I/O 516. In a similar manner, OBU 502 and processor 504 can access vehicle information through communication I/O 518. OBU 502 can communicate with one or more intra-vehicle communication network, for example, first through gateway 520, and subsequently connect to one or more high speed CAN 522 (for accessing motor, traction control, gear box info), low speed CAN 524 (for accessing comfort related info), or Local Interconnect Network (LIN) 526 via bus 528 for accessing sensor/actuator information. In an alternative embodiment, OBU 502 may directly connect to one or more CANs via bus 530. In addition, Gateway 520 may allow access to one or more ECU 532 and devices accessible through a Media Oriented Systems Transport (MOST) bus system 534 for accessing multimedia systems (e.g., navigation system). In an embodiment, an FSO transceiver unit receives a transmission containing information derived from a data stream and processed by the processor 504 of OBU 502. Processor 504 executes programmed instructions to adjust the vehicle systems such as braking, steering, acceleration and alerts, based on the received information. Intercepting and processing information from surrounding vehicles provides the receiving vehicle with situational awareness and allows the vehicle to anticipate potential hazardous driving situations. A vehicle within the traffic network must also generate and transmit its real-time reactions to the received information. The sensor suite from LIN 526 and devices accessible through MOST 534 generates real-time data regarding a vehicle's location, position, braking, speed, velocity, or acceleration, and relays the data to processor 504. Processor 504 coordinates with one or more ECU 532 to execute instructions to send the outgoing sensor suite information to one or more vehicle within the network through control of FSO transceiver 514. The optical signal is received by one or more direct LOS FSO transceiver of an adjacent vehicle within a set of vehicles. The pattern of encoding, transmitting, receiving and decoding is distributed through a network or cars. Continuous input from a set of vehicles allows one or more OBU to establish a mesh network connection and provide situational awareness to all drivers within the set. The aforementioned attributes make FSO technology optimal for use in vehicular traffic networking where it is necessary to communicate accurate data ahead and behind vehicles for multiple car lengths at a high rate of speed. The encoded transmitted data is a compilation of information regarding real-time behavior of a vector as well as inertial input from various sensors within a vehicle. Data from these sensors provide a more accurate picture of the location and behavior of the vehicle, not merely a straight-line approximation of a vehicle's path. FSO communication allows vehicles to anticipate events from multiple cars without overcrowding a channel. The meshing of multiple vehicles provides situational awareness to all the drivers receiving the data communication.

The present disclosure includes that contained in the appended claims as well as that of the foregoing description. Although this invention has been described in its exemplary forms with a certain degree of particularity, it is understood that the present disclosure of has been made only by way of example and numerous changes in the details of construction and combination and arrangement of parts may be employed without departing from the spirit and scope of the invention.

What is claimed is:

1. A vehicle-to-vehicle communication system comprising:
    at least one free space optical transmitter being operably configured to receive a binary data stream input, the at least one free space optical transmitter comprising a modulator, a diode driver, and at least one diode, the modulator being operable engaged with the diode driver to convert the binary data stream according to a predetermined modulation schema into a series of modulated electrical inputs, the at least one diode being operably engaged with the diode driver convert the series of modulated electrical inputs into a modulated optical output;
    at least one free space optical receiver operably engaged with the at least one free space optical transmitter, the at least one free space optical receiver comprising a photodetector, an amplifier-filter and an analog-to-digital converter, the photodetector being operable to receive and convert the modulated optical output into an electrical signal, the electrical signal being processed through the amplifier-filter and converted to a digital data stream via the analog-to-digital converter, the demodulator being operable to decode the digital data stream to produce an encoded digital data stream output;
    at least one self-contained light assembly being mountable to a front, side, rear, top, or bottom location of a vehicle, the at least one free space optical transmitter and the at least one optical receiver being housed within the at least one self-contained light assembly; and
    an on-board processing unit configured to control the at least one free space optical transmitter and the at least one optical receiver,
    wherein the on-board processing unit is configured to communicate with one or more intra-vehicle communication network to receive one or more data inputs corresponding to real-time vehicle behavior,
    wherein the at least one self-contained light assembly is operably engaged with the at least one free space optical transmitter to transmit a free space optical output corresponding to the real-time vehicle behavior.

2. The vehicle-to-vehicle communication system of claim 1 wherein the output electrical photocurrent has a wavelength band in the range of 850 nm to 950 nm.

3. The vehicle-to-vehicle communication system of claim 1 wherein the diode is selected from the group consisting of LD, LED, VLC LED, color LED, white LED, blue LED, ultraviolet LED, phosphor-based LED, organic LED, quantum-dot LED, high-powered LED, taillight LED, headlamp LED, visible light LED, micro LED, double heterostructure laser, quantum well laser, quantum cascade laser, resonant-cavity, and distributed Bragg reflector laser.

4. The vehicle-to-vehicle communication system of claim 1 wherein the photodetector is selected from the group consisting of PIN photodiode, avalanche photodiode, CMOS sensor, CCD, and CCD array.

5. The vehicle-to-vehicle communication system of claim 1 wherein the output electrical photocurrent is proportional to a measure of irradiance at the receiver.

6. The vehicle-to-vehicle communication system of claim 1 wherein the modulation schema is an on-off key modulation or pulse-position modulation.

7. The vehicle-to-vehicle communication system of claim 1 further comprising a non-limiting transimpedance amplifier operably engaged with the amplifier-filter.

8. The vehicle-to-vehicle communication system of claim 1 wherein the at least one free space optical transmitter and the at least one free space optical receiver are housed within the at least one self-contained light assembly.

9. The vehicle-to-vehicle communication system of claim 6 wherein the modulation schema is configured such that a data bit 1 is sent by radiating power from the diode and a data bit 0 is sent when the diode is in an off state.

10. A vehicle-to-vehicle communication network comprising:
    a plurality of vehicles, each vehicle in the plurality of vehicles having at least one free space optical transceiver, at least one self-contained light assembly, and an on-board unit,
    wherein the at least one free space optical transceiver is configured to send and receive free space optical transmissions,
    wherein the at least one self-contained light assembly is mounted to a front, side, rear, top, or bottom location of each vehicle in the plurality of vehicles and is operably engaged with the at least one free space optical transceiver,
    wherein the on-board unit is operably engaged with the at least one free space optical transceiver and the at least one self-contained light assembly to execute at least one vehicle-to-vehicle network communication protocol, wherein the on-board unit is configured to communicate with one or more intra-vehicle communication network to receive one or more data inputs corresponding to real-time vehicle behavior, wherein the at least one self-contained light assembly is operably engaged with the at least one free space optical transceiver to transmit a free space optical output corresponding to the real-time vehicle behavior.

11. The vehicle-to-vehicle communication network of claim 10 wherein the at least one free space optical transceiver is operable to determine one or more inter-vehicle attribute selected from the group consisting of distance, range, location, speed, velocity, and acceleration.

12. The vehicle-to-vehicle communication network of claim 10 wherein the at least one vehicle-to-vehicle network communication protocol defines a vehicle ad-hoc network.

13. The vehicle-to-vehicle communication network of claim 10 wherein the on-board unit is operable to convey information regarding real-time vehicle behavior via a digital bit stream to the at least one free space optical transceiver.

14. The vehicle-to-vehicle communication network of claim 10 wherein each vehicle in the plurality of vehicles is operable to communicate one or more inter-vehicle attribute selected from the group consisting of location, range, distance, speed, heading, velocity, acceleration, braking, deceleration, emergency breaking, forward collision warning, blind spot warning, lane change warning, traffic jam warning, curve speed warning, hazard location notification, maintaining a dynamic state map, perform continuous threat assessment, emergency vehicle, identify dangerous scenarios, inoperative vehicles, crash event, cooperative adaptive cruise control, cooperative merging, automatic longitudinal or lateral gap distance keeping, cooperative awareness messaging, decentralized environment notifications, and alerts.

15. The vehicle-to-vehicle communication network of claim 10 wherein the at least one vehicle-to-vehicle network communication protocol is selected from the group consisting of unicast, multicast, and broadcast communication.

16. The vehicle-to-vehicle communication network of claim 13 wherein the at least one self-contained light assembly is operably engaged with the at least one free space optical transceiver to transmit a free space optical output corresponding to the real-time vehicle behavior.

17. A free space optical communication system comprising:

at least one free space optical transmitter being operably configured to receive a binary data stream input, the at least one free space optical transmitter comprising a modulator, a diode driver, and at least one diode, the modulator being operable engaged with the diode driver to convert the binary data stream according to a modulation schema into a series of modulated electrical inputs, the at least one diode being operably engaged with the diode driver convert the series of modulated electrical inputs into an output electrical photocurrent;

at least one free space optical receiver operably engaged with the at least one free space optical transmitter, the at least one free space optical receiver comprising a photodetector, an amplifier-filter and an analog-to-digital converter, the photodetector being operable to receive and convert the modulated optical output into an electrical signal, the electrical signal being processed through the amplifier-filter and converted to a digital data stream via the analog-to-digital converter, the demodulator being operable to decode the digital data stream to produce an encoded digital data stream output;

at least one self-contained light assembly being mountable to a front, side, rear, top, or bottom location of a vehicle, the at least one free space optical transmitter and the at least one optical receiver being operably engaged with the at least one self-contained light assembly; and at least one mountable on-board unit comprising a processor, at least one memory device, and input/output device, and a user interface, the at least one mountable on-board unit being operable to control the at least one free space optical transmitter and the at least one optical receiver, wherein the at least one mountable on-board unit is configured to communicate with one or more intra-vehicle communication network to receive one or more data inputs corresponding to real-time vehicle behavior, wherein the at least one self-contained light assembly is operably engaged with the at least one free space optical transmitter to transmit a free space optical output corresponding to the real-time vehicle behavior.

18. The vehicle-to-vehicle optical communication system of claim 17 wherein the processor of the at least one mountable on-board unit is operable to execute instructions to adjust one or more vehicle systems based on an optical input received by the at least one free space optical receiver.

* * * * *